(12) United States Patent
Lee

(10) Patent No.: US 7,136,968 B2
(45) Date of Patent: Nov. 14, 2006

(54) SYSTEM AND METHOD FOR MAINTAINING CACHE CONSISTENCY IN A WIRELESS COMMUNICATION SYSTEM

(75) Inventor: Sang-Keun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 10/423,422

(22) Filed: Apr. 25, 2003

(65) Prior Publication Data

US 2003/0204678 A1 Oct. 30, 2003

(30) Foreign Application Priority Data

Apr. 27, 2002 (KR) ............... 10-2002-0023263

(51) Int. Cl.
*G06F 12/08* (2006.01)
(52) U.S. Cl. .................. 711/141; 711/145; 711/144
(58) Field of Classification Search ............ 711/118, 711/141, 145, 144
See application file for complete search history.

(56) References Cited

U.S. PATENT DOCUMENTS

| | | | | | |
|---|---|---|---|---|---|
| 5,581,704 | A | * | 12/1996 | Barbara et al. | 711/141 |
| 5,706,435 | A | * | 1/1998 | Barbara et al. | 711/141 |
| 5,825,759 | A | * | 10/1998 | Liu | 370/331 |
| 6,128,648 | A | * | 10/2000 | Chen et al. | 709/213 |
| 2004/0085980 | A1 | * | 5/2004 | Lee | 370/412 |

OTHER PUBLICATIONS

Qinglong Hu, Dick Lun Lee, "Adaptive Cache Invalidation Methods in Mobile Invironments", IEEE transaction on Computers, 1997, pp. 264-273.*
Pitoura, E.; Chrysanthis, P.K.; "Multiversion Data Broadcast", IEEE Transactions on Computers, vol. 51, Issue 10, Oct. 2002 pp.:1224-1230.*
Kian-Lee Tian; Jun Cai; Beng Chin Ooi; "An Evaluation Of Cache Invalidation Strategies In Wireless Environments", IEEE Transactions on Parallel and Distributed Systems, vol. 12, Issue 8, Aug. 2001 pp.:789-807.*
Cao G. Das, C.; "On The Effectiveness Of A Counter-Based Cache Invalidation Scheme And Its Resiliency To Failures In Mobile Environments", IEEE Symposium on Reliable Distributed Systems, Oct. 28-31, 2001 pp.:247-256.*
Blaze et al, "Dynamic Hierarchical Caching in Large-Scale Distributed file Systems", 1992, pp. 521-528.*
"Cache Invalidation Patterns in Shared-Memory Multiprocessors", Jul. 1992, pp. 794-810.*
T. Imielinski et al., "Data Dissemination in Wireless and Mobile Environments", Published in Technical Report 59, WINLAB, Rutgers University, Jun. 1993.*

* cited by examiner

*Primary Examiner*—Pierre-Michel Bataille
(74) *Attorney, Agent, or Firm*—Lee, Hong, Degerman, Kang & Schmadeka

(57) ABSTRACT

An invalidation bit pattern (IBP) for maintaining transaction cache consistency in a wireless communication system is provided. The IBP comprises at least one bit corresponding to at least one cached data stored on a cache of a mobile communication terminal, wherein the bit value represents whether the corresponding cached data was updated in a communication server during a first broadcast period, said first broadcast period associated with a first time stamp; and an IBP time stamp representing time the IBP was broadcast; wherein if the difference between the IBP time stamp and the first time stamp is larger than a threshold value, then all cached data stored on the cache is replaced with updated data from the communication server; and wherein if the difference between the IBP time stamp and the first time stamp is not larger than a threshold value, then updating the corresponding cached data with updated data from the communication server, if the bit value represents that the corresponding cached data was updated.

18 Claims, 4 Drawing Sheets

SYSTEM AND METHOD FOR MAINTAINING CACHE CONSISTENCY IN A WIRELESS COMMUNICATION SYSTEM

CROSS REFERENCE TO RELATED APPLICATIONS

Pursuant to 35 U.S.C. § 119(a), this application claims the benefit of earlier filing date and right of priority to the Korean Application No. 2002-23263, filed on Apr. 27, 2002, the content of which is hereby incorporated by reference herein in its entirety.

BACKGROUND OF THE INVENTION

1. Field of the Invention

The present invention relates to a wireless communication system, and particularly, to a system and a method for maintaining cache consistency in a wireless communication system.

2. Description of the Background Art

Due to development of wireless communication technology and popularization of portable communication devices, many wireless communication environments are introduced.

Mobile transactions in a wireless communication environment, typically, are comprised of multiple sub-operations. The successful execution of a mobile transaction is therefore dependent on successful execution of all its sub-operations.

Execution of a transaction in a wireless communication environment is limited by mobility of the mobile communication terminal, disconnection frequency, limited bandwidth, battery capacity, etc. Therefore, in order to efficiently use the limited bandwidth and to improve response time, a caching method is used.

Referring to FIG. 1, a typical wireless communication system comprises a mobile communication terminal 10 for caching data which is accessed frequently; and a communication server 20 for wirelessly communicating with the mobile communication terminal 10.

In case that the data is updated in the communication server 20, the communication server 20 broadcasts an invalidation report (IR) to update the cached data to maintain the consistency of the cached data. Since the wireless communication network has limited bandwidth, it is desirable that the communication server 20 notifies the mobile communication terminal 10 of the data update as little as possible. Therefore, the communication server 20 does not transmit the IR to the mobile communication terminal 10 whenever the data is updated, but it broadcasts the IR in certain intervals.

However, the mobile communication terminal 10 and the communication server 20 are frequently disconnected due to the mobility of the mobile communication terminal and the limited battery capacity. Therefore, since the mobile communication terminal 10 cannot receive the IR broadcasted from the communication server 20 due to the frequent disconnections, the cache consistency is not maintained. Thus, a system and method for maintaining cache consistency between the mobile communication terminal 10 and the communication server 20 is needed.

FIG. 2 shows a method for maintaining cache consistency in a general wireless communication system. FIG. 3 shows a method when the IR is broadcast regularly from the communication server to the mobile communication terminal for maintaining the cache consistency.

Generally, the communication server 20 broadcasts data which can be used in mobile transaction process by the mobile communication terminal 10. When the entire data reaches the mobile communication terminal 10, the mobile communication terminal 10 caches the data which is accessed frequently in the entire data, in the cache (i.e., transaction cache).

The communication server 20 broadcasts information (i.e., invalidation report and entire data) during several broadcasting periods (w) at each broadcast period (L). The invalidation report and the entire data may be broadcast simultaneously, or the entire data may be broadcast right after the invalidation report, in case that one forwarding channel is used. Whether or not the IR and the entire data are broadcast simultaneously is not important.

The IR includes broadcast time stamp ($T_i$) representing the time of present broadcast period and update list (j, $t_j$). j represents updated data item (identifier of the data) and $t_j$ is updated time stamp representing the last updating time of the data (j). Several broadcast periods w (w>1) can be set to be maximum interval through which the mobile communication terminal 10 can endure the disconnection.

The mobile communication terminal 10 receives the entire cache data and update history that occurred during the previous several broadcast periods w by way of periodical broadcasts from the server 20 (S11). The mobile communication terminal 10 then determines whether or not there was a disconnection within a range which the mobile communication terminal 10 could not endure (S13). The mobile communication terminal 10 has a last receive time stamp $ts_{lb}$ representing the latest reception time of the IR, and compares the last receive time stamp to the broadcast time stamp $T_i$ of the received IR.

If the time difference between the broadcast time stamp $T_i$ and the last receive time stamp is not larger than above w, the mobile communication terminal 10 decides that there was not a disconnection that the mobile 10 communication terminal 10 could not endure, and updates the corresponding data of the cache by the received IR to maintain the cache consistency (S15). Additionally, the mobile communication terminal 10 assigns the last receive time stamp as the broadcast time stamp $T_i$ of the received IR.

However, if the time difference between the broadcast time stamp $T_i$ and the last receive time stamp is larger than w, the mobile communication terminal 10 decides that there was a disconnection that the mobile communication terminal 10 could not endure, and drops all data cached on the cache (S17). In addition, the mobile communication terminal 10 requests the communication server 20 to provide the entire cache data, and updates the entire cache data (S19).

As described above, according to the general method for maintaining the cache consistency, the mobile communication terminal is able to deal with the disconnection for a predetermined period (w) by broadcast periodically the update history during the previous several broadcast periods. According to the above method, the information (i.e., IR and entire data) occurred during the several broadcast periods is broadcast periodically, and thereby, the narrow bandwidth is not used efficiently. Also, the IR includes the update time stamp and the identifier of the updated data, and thereby, the information bits included in the IR are increased.

SUMMARY OF THE INVENTION

In accordance with one embodiment of the invention, a system and a method for maintaining cache consistency in a wireless communication system are provided so that communication bandwidth can be efficiently used and cache consistency can be effectively maintained, even in case that disconnection is generated frequently in a wireless data broadcast environment.

In one embodiment, a cache consistency system for a mobile communication terminal in communication with a communication server in a wireless communication network, the cache consistency system comprises a cache medium for storing cache data in the mobile communication terminal; wherein the communication server broadcasts an invalidation bit pattern (IBP) representing whether or not cache data associated with the bit pattern is invalidated at a broadcast period;, wherein at least one bit in the IBP is associated with at least one cache data, such that the mobile communication terminal invalidates a particular cache data corresponding to a particular bit in the IBP.

In certain embodiments, the communication server further broadcasts additional data required to process a mobile transaction by the mobile communication terminal along with the IBP. There is a one to one correspondence between a bit in the IBP and at least one cached data. At least one bit in the IBP represents whether or not the at least one corresponding cache data is updated during a previous broadcast period. The IBP comprises a broadcast time stamp representing a time associated with a present broadcast period.

A value of "1" for an IBP bit represents that cache data corresponding to the bit was updated during a previous broadcast period. A value of "0" for an IBP bit represents that cache data corresponding to the bit was not updated during the previous broadcast period. If the particular cache data is invalidated, then the particular cache data is replaced with updated cache data provided by the communication server. If the timestamp of the IBP is older than a predetermined value, then a substantial portion of the cache data stored on the cache medium is updated based on additional data provided by the communication server.

Thus, where an IBP comprises a time stamp t1, and wherein t2 represents the time when a last IBP was received by the mobile communication terminal. If the difference between t1 and t2 is greater than a threshold value, then a substantial portion of the cache data stored on the cache medium is updated based on additional data provided by the communication server.

In one or more embodiments, a method for maintaining cache consistency of a mobile communication terminal in communication with a communication server in a wireless communication network, the method comprises broadcasting an invalidation bit pattern (IBP) from the communication server to the mobile communication terminal, the IBP comprising a plurality of bits, at least one bit representing whether or not a corresponding cached data for a mobile communication transaction is invalidated after a previous broadcast period; determining whether or not a disconnection in communication between the mobile communication terminal and the communication server occurred based on a time stamp of the IBP; updating invalidated cached data based on updated information included in the IBP, if it is determined that the disconnection did not occur; and updating a first portion of the cached data based on updated information included in the IBP, if it is determined that the disconnection did occur.

An invalidation bit pattern (IBP) for maintaining transaction cache consistency in a wireless communication system comprises at least one bit corresponding to at least one cached data stored on a cache of a mobile communication terminal, wherein the bit value represents whether the corresponding cached data was updated in a communication server during a first broadcast period, said first broadcast period associated with a first time stamp; and an IBP time stamp representing time the IBP was broadcast; wherein if the difference between the IBP time stamp and the first time stamp is larger than a threshold value, then all cached data stored on the cache is replaced with updated data from the communication server; and wherein if the difference between the IBP time stamp and the first time stamp is not larger than a threshold value, then updating the corresponding cached data with updated data from the communication server, if the bit value represents that the corresponding cached data was updated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
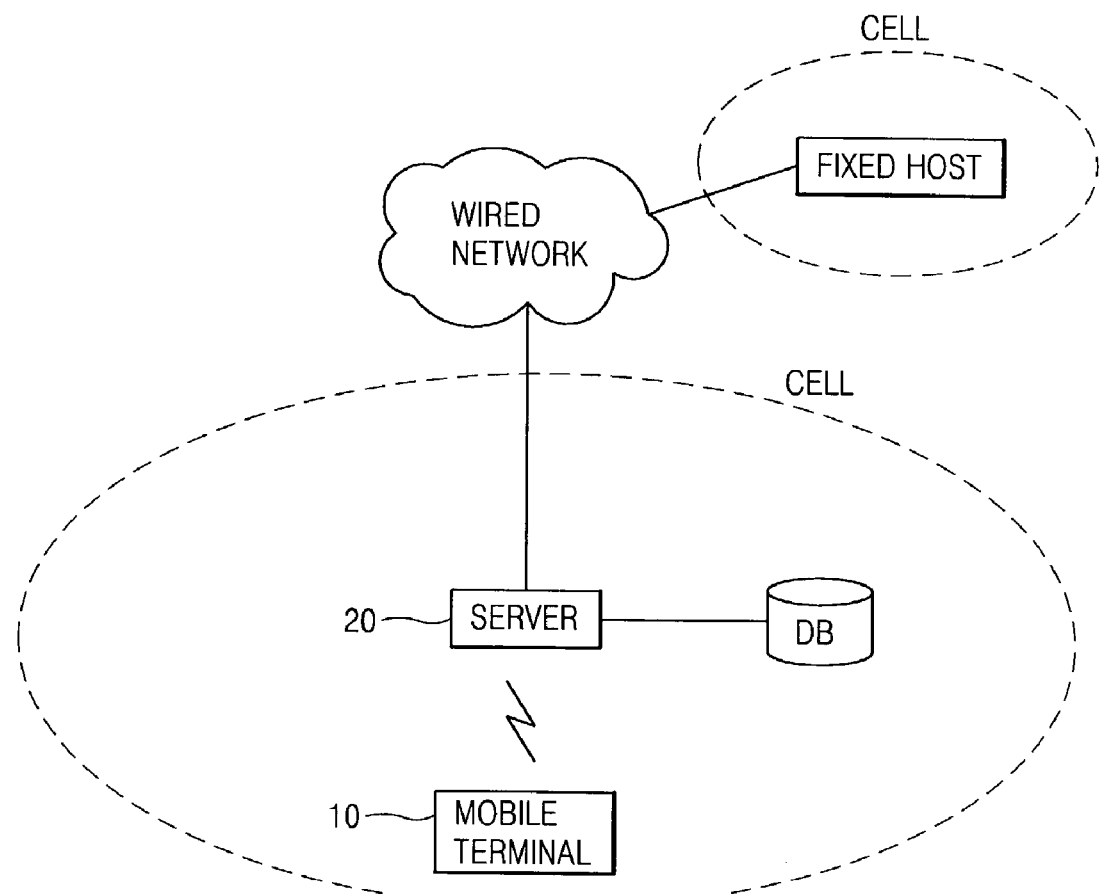
FIG. 1 illustrates a general wireless communication system configuration.
Figure 2:
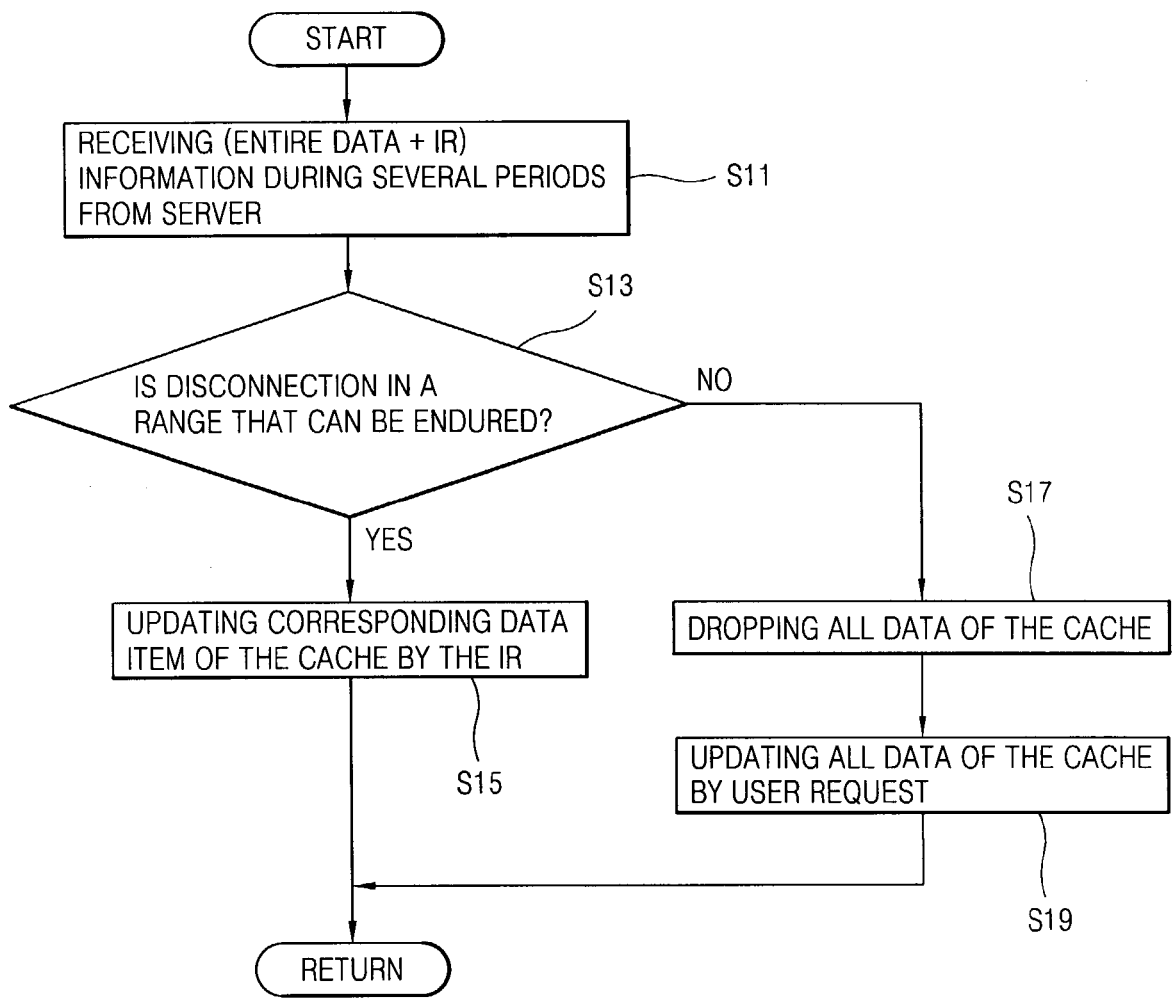
FIG. 2 illustrates a method for maintaining cache consistency in the general wireless communication system.
Figure 3:
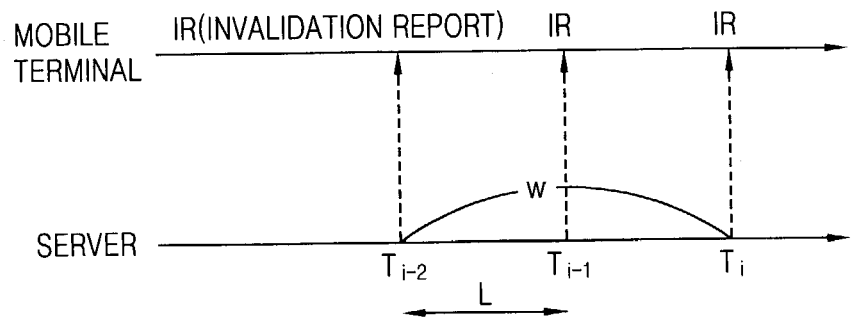
FIG. 3 illustrates a method for broadcast invalidation report regularly from a communication server to a mobile communication terminal in order to maintain the cache consistency.
Figure 4:
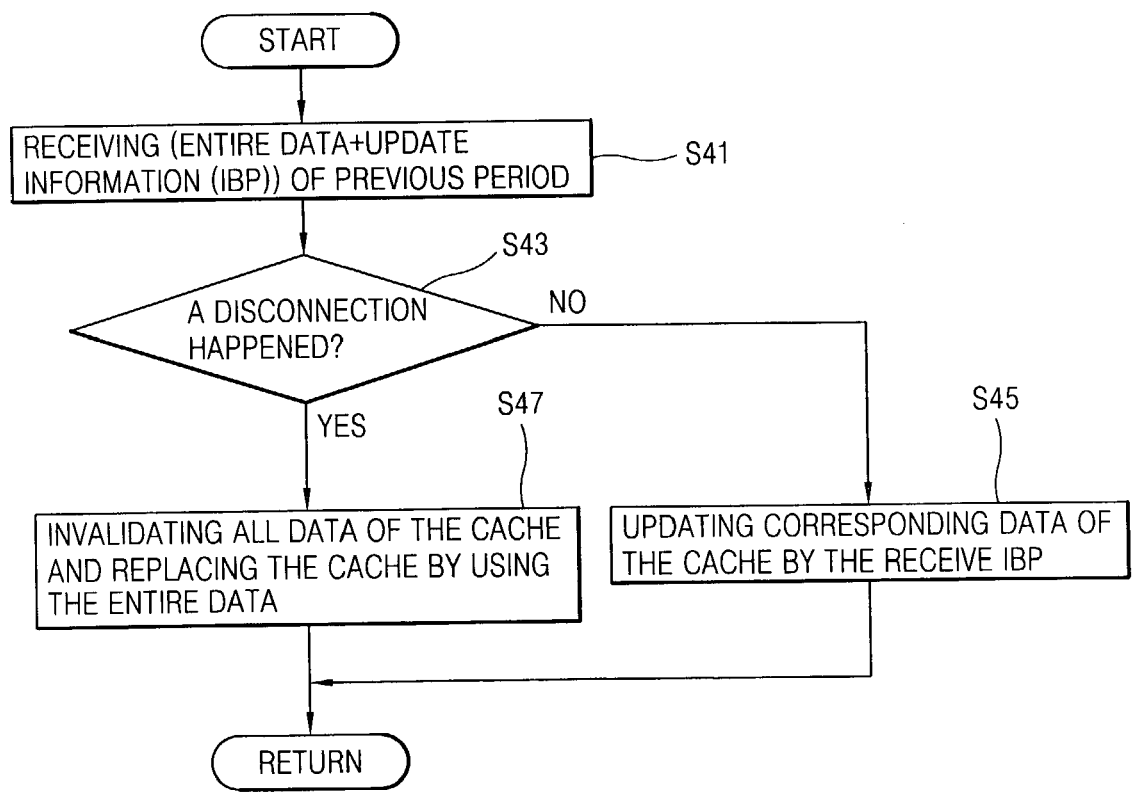
FIG. 4 illustrates a method for maintaining cache consistency in a wireless communication system, according to an embodiment of the present invention.

Referring to FIGS. 2 and 4, an invalidation bit pattern (IBP) is broadcasted between a communication server 20 and a mobile communication terminal 10. The IBP comprises a broadcast time stamp $T_i$ representing the time of present broadcast period, and may include a plurality of bits. The respective bit is aligned by one data item, and represents whether or not corresponding data is updated during a previous broadcast period. In some embodiments, the IBP does not include an update time stamp which represents the updated time. For example, if an arbitrary bit in the invalidation bit pattern is set to "1", it means that the data corresponding to the bit is updated during the previous one broadcast period, and if the bit is set to "0", it means the corresponding data is not updated during the previous broadcast period.

Figure 5:
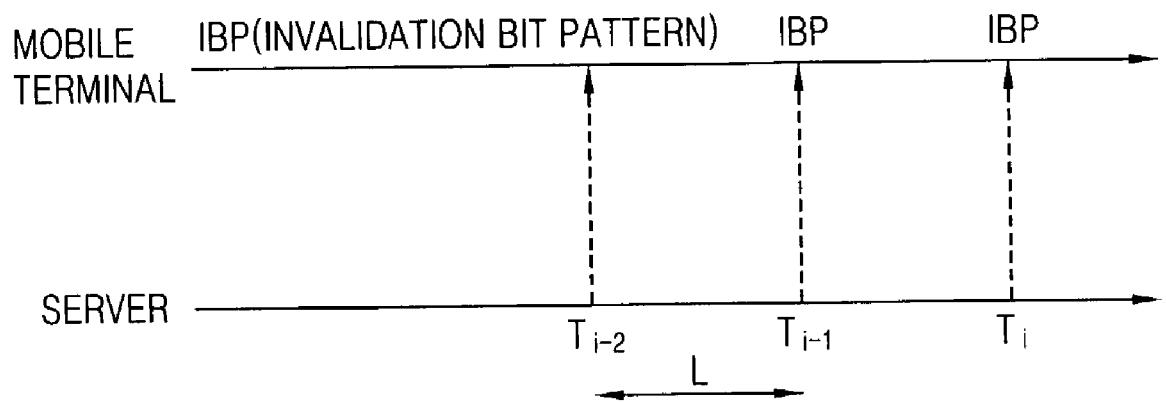
FIG. 5 illustrates a method for broadcast invalidation bit pattern from a communication server to a mobile communication terminal in order to maintain cache consistency, according to an embodiment of the present invention.

Referring to FIG. 5, the communication server 20 broadcasts IBP and entire data that occurred during a previous broadcast period, within broadcast period (L). The mobile communication terminal 10 receives the entire data and the IBP that occurred during the previous broadcast period in the broadcast period (L) (S41). The mobile communication terminal 10 then determines whether or not a disconnection happened (S43).

The mobile communication terminal 10 stores the last received time stamp $ts_{lb}$, representing the last time the IBP was received, and compares the last received time stamp to the received broadcast time stamp $T_i$. If time difference between the broadcast time stamp $T_i$ and the last receive time stamp is not larger than the above broadcast period L, the mobile communication terminal 10 determines that there was no disconnection and maintains the cache consistency by updating the corresponding data of the cache by the received IBP (S45). Then, the mobile communication terminal 10 assigns the last receive time stamp as the received broadcast time stamp $T_i$.

However, if the time difference between the broadcast time stamp $T_i$ and the last receive time stamp is larger than the broadcast period L, the mobile communication terminal 10 decides that there was the disconnection, invalidates all data cached on the cache and replaces the cache using the received entire data (S47).

For example, in case that the mobile communication terminal 10 performs stock trading transaction, the communication server 20 broadcasts information such as company names registered in the Stock Exchange and stock price of the companies (e.g., the information represents the entire data) in broadcast period (L) interval, and the mobile communication terminal 10 caches required company name and the stock price of the company. In one embodiment, for example, the stock exchange transaction of a mobile communication terminal 10 may function to purchase the stocks of A company, when the stock price of the A company falls under a desired price. Thus, the mobile communication terminal 10 caches the stock price data of the A company. Then, for example, the first bit of the invalidation bit pattern is mapped with the stock price data of the A company. Also, in case that the stock price information of B company is cached, the second bit of the IBP may be mapped with the stock price information of the B company.

When the stock price of the A company is updated, the communication server 20 updates the value of, for example, the first bit in the IBP to be "1" and after that, broadcasts the IBP in order to maintain consistency with respect to the stock price of A company between the mobile communication terminal 10 and the communication server 20. The entire data may include the updated stock price of the A company and stock prices of all other companies.

The mobile communication terminal 10 based on the received the IBP recognizes that the stock price of the A company is updated, and the mobile communication terminal 10 uses the broadcasted A company stock price (i.e., the updated A company stock price), not the cached A company stock price. Thereafter, the mobile communication terminal 10 caches the updated A company stock price in the cache. In case of a disconnection happened, the mobile communication terminal 10 invalidates all data in the cache, and caches the required data out of the broadcasted entire data.

According to one embodiment of the present invention, the update information during one broadcast period is provided to the mobile communication terminal periodically through the invalidation bit pattern, and therefore, the bandwidth usage efficiency is greatly improved in case that a great number of caching data is not invalidated.

The system and method for maintaining the cache consistency in the wireless communication system, according to the present invention, can help save the narrow communication bandwidth by reducing the amount of information that has to be cached at each broadcast interval.

Also, according to one embodiment, data items can be aligned one by one to a respective bit of the IBP which is broadcasted regularly. The respective bit represents whether or not the corresponding data is updated during a previous broadcast period. As such, the one to one correspondence eliminates the need for the IBP to include the identifier of the corresponding data or the update time stamp. Therefore, the amount of information which is regularly broadcasted is reduced, by eliminating information bits that are not necessary at that point of communication.

In case of a disconnection, cache consistency can be maintained by the regularly broadcasted IBP. The power consumption of the mobile communication terminal can be reduced if less information is cached at each broadcast period. The present invention also has an effect of dealing with the disconnection effectively without using the recent data update history (i.e., data update information during previous several broadcast periods).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims.

What is claimed is:

1. A method for maintaining cache consistency of a mobile communication terminal in communication with a communication server in a wireless communication network, the method comprising:

broadcasting an invalidation bit pattern (IBP) from the communication server to the mobile communication terminal, the IBP comprising a plurality of bits, at least one bit representing whether or not a corresponding cached data for a mobile communication transaction is invalidated after a first broadcast period, wherein the mobile communication terminal receives the IBP whether or not a disconnection in communication between the mobile communication terminal and the communication server occurs;

determining whether or not the disconnection in communication between the mobile communication terminal and the communication server occurred based on a time stamp of the IBP;

updating invalidated cached data based on updated information included in the IBP, if it is determined that the disconnection did not occur; and updating a first portion of the cached data based on updated information included in the IBP, if it is determined that the disconnection did occur;

wherein the mobile communication terminal comprises a cache for caching transaction data, wherein an IBP comprises a time stamp t1, and wherein t2 represents time when a last IBP was received by the mobile communication terminal, the method further comprising replacing a first portion of the cached data by a most recent transaction data provided by the communication server, if the difference between t1 and t2 is greater than a threshold value.

2. The method of claim 1, wherein the first portion of the cached data comprises entire cached data.

3. The method of claim 1, wherein cache data is invalidated if it is required to be updated after the first broadcast period due to changes to corresponding data on the communication server.

4. The method of claim 1, wherein at least one bit in the IBP corresponds to at least one cached data, said bit representing whether or not the corresponding cached data is updated during the first broadcast period.

5. The method of claim 1, wherein the IBP comprises a broadcast time stamp representing time when the IBP was broadcast.

6. The method of claim 1, wherein a value of "1" for a bit of the IBP represents that data corresponding to the bit was updated during the first broadcast period, and a value of "0" for a bit of the IBP represents that data corresponding to the bit was not updated during said first broadcast period.

7. The method of claim 1, wherein the mobile communication terminal comprises a cache for caching transaction data, wherein an IBP comprises a time stamp t1, and wherein t2 represents time when a last IBP was received by the mobile communication terminal, wherein it is determined that the disconnection has occurred if the difference between ti and t2 is more than a threshold value.

8. The method of claim 1 wherein the first portion of the cached data comprises all data stored on the cache.

9. A cache consistency system for a mobile communication terminal in communication with a communication server in a wireless communication network, the cache consistency system comprising:
a cache medium for storing cache data in the mobile communication terminal; wherein the communication server broadcasts an invalidation bit pattern (IBP) representing whether or not cache data associated with the bit pattern is invalidated at a broadcast period; wherein at least one bit in the IBP is associated with at least one cache data, such that the mobile communication terminal invalidates a particular cache data corresponding to a particular bit in the IBP; wherein the mobile communication terminal receives the IBP whether or not a disconnection in communication between the mobile communication terminal and the communication server occurs; wherein the IBP comprises a time stamp t1, and wherein t2 represents the time when a last IBP was received by the mobile communication terminal, wherein if the difference between ti and t2 is greater than a threshold value, then a substantial portion of the cache data stored on the cache medium is updated based on additional data provided by the communication server.

10. The system of claim 9, wherein the communication server further broadcasts additional data required to process a mobile transaction by the mobile communication terminal along with the IBP.

11. The system of claim 9, wherein there is a one to one correspondence between a bit in the IBP and at least one cached data.

12. The system of claim 9, wherein at least one bit in the IBP represents whether or not the at least one corresponding cache data is updated during a first broadcast period.

13. The system of claim 9, wherein the IBP comprises a broadcast time stamp representing a time associated with a first broadcast period.

14. The system of claim 12, wherein a value of "1" for an IBP bit represents that cache data corresponding to the bit was updated during a first broadcast period.

15. The system of claim 12, wherein a value of "0" for an IBP bit represents that cache data corresponding to the bit was not updated during a first broadcast period.

16. The system of claim 9, wherein if the particular cache data is invalidated, then the particular cache data is replaced with updated cache data provided by the communication server.

17. The system of claim 13, wherein if the timestamp of the IBP is older than a predetermined value, then a substantial portion of the cache data stored on the cache medium is updated based on additional data provided by the communication server.

18. An invalidation bit pattern (IBP) for maintaining transaction cache consistency in a wireless communication system comprising:
at least one bit corresponding to at least one cached data stored on a cache of a mobile communication terminal, wherein the bit value represents whether the corresponding cached data was updated in a communication server during a first broadcast period, said first broadcast period associated with a first time stamp; and
an IBP time stamp representing time the IBP was broadcast;
wherein if the difference between the IBP time stamp and the first time stamp is larger than a threshold value, then all cached data stored on the cache is replaced with updated data from the communication server; and
wherein if the difference between the IBP time stamp and the first time stamp is not larger than a threshold value, then updating the corresponding cached data with updated data from the communication server, if the bit value represents that the corresponding cached data was updated.

* * * * *